(12) United States Patent
Luege Mateos

(10) Patent No.: US 8,156,056 B2
(45) Date of Patent: Apr. 10, 2012

(54) METHOD AND SYSTEM OF CLASSIFYING, RANKING AND RELATING INFORMATION BASED ON WEIGHTS OF NETWORK LINKS

(76) Inventor: Fernando Luege Mateos, Mexico City (MX)

( * ) Notice: Subject to any disclaimer, the term of this patent is extended or adjusted under 35 U.S.C. 154(b) by 962 days.

(21) Appl. No.: 12/076,917

(22) Filed: Mar. 25, 2008

(65) Prior Publication Data
US 2008/0249966 A1 Oct. 9, 2008

Related U.S. Application Data

(60) Provisional application No. 60/907,461, filed on Apr. 3, 2007.

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................................... 706/20

(58) Field of Classification Search ........................ None
See application file for complete search history.

(56) References Cited

U.S. PATENT DOCUMENTS

| | | | |
|---|---|---|---|
| 6,285,999 B1 | 9/2001 | Page | |
| 6,584,468 B1 * | 6/2003 | Gabriel et al. | 1/1 |
| 7,194,466 B2 * | 3/2007 | Chen et al. | 1/1 |
| 2003/0018626 A1 * | 1/2003 | Kay et al. | 707/3 |

* cited by examiner

*Primary Examiner* — Jeffrey A Gaffin
*Assistant Examiner* — Li-Wu Chang
(74) *Attorney, Agent, or Firm* — Dowell & Dowell, PC

(57) ABSTRACT

What is disclosed is an automatic method of classification, qualification and relation of information that is based on a network built starting from the semantic, numeric, conceptual, etc. relationships between elements of different sets that are structurally alike. Through the topological properties of the network, we generate a vector of relations for each element that allows us to analyze the similarity among them, improve and facilitate the clustering processes, carry out personalized dynamic ranking, analyze conduct patterns as well as maintain the auto evolving dynamic of the network through the interaction and feedback of its elements, among other characteristics.

15 Claims, 4 Drawing Sheets

METHOD AND SYSTEM OF CLASSIFYING, RANKING AND RELATING INFORMATION BASED ON WEIGHTS OF NETWORK LINKS

CROSS REFERENCE TO PRIOR APPLICATIONS

This application claims priority from U.S. provisional application No. 60/907,461, filed on Apr. 3, 2007, the entire contents of which are incorporated herein by reference.

FIELD OF THE INVENTION

This invention pertains to the field of data processing involving information classification, qualification and relation. In particular, it relates to a method and system of classifying, ranking and relating information based on mathematical graphs and networks.

BACKGROUND OF THE INVENTION

The invention relates to a method and system for classifying, ranking and relating information based on mathematical graphs and networks. In general, the topology of a network, composed of nodes and links between them, can be studied as a graph.

A graph G is made of a finite set of vertexes or nodes V and another set of edges or links E, defined as non-arranged vertex couples, so if e∈E, then e=(u, v) where u, v∈V.

Two vertexes u, v∈V are neighbors or adjacent if an edge e∈E exists in such a way that it links them. The number of vertexes in a graph is known as the order of the graph, |G|.

The degree of a vertex is the number of edges that incise in it and we define P(k) as the probability that a vertex is of k degree. A regular graph of n degree is the one where each node is related exactly with n edges.

A walking between two vertexes $x_0$ and $x_n$ is a non-void graph $\rho=(V,E)$ so that
$V=\{x_0, x_1, \ldots, x_n\}$
$E=\{x_0, x_1, x_1 x_2, \ldots, x_{n-1} x_n\}$
where $x_i \neq x_j \ \forall i, j \in \{1, \ldots n\}$.

The distance between two vertexes of the graph is defined as the shortest walking between them and the average distance among any couple of vertexes is the diameter of the graph.

A guided graph or digraph is the one where the direction of the edge is significant, that is, where each edge connects an initial edge with a final vertex. In digraphs, the direction of the edge is fundamental.

Known network-based ranking systems generally are based on the topologic structure of the network. Generally, these known ranking systems are static systems. For example, one such system uses a link analysis algorithm which assigns a numerical weighting to each element of a hyperlinked set of documents, interpreting each incoming link to a document as a vote to that document and defining a static weight measure for every document saved in a large matrix. One major disadvantage of a static system is that each time a network changes, one generally needs to re-explore the network and re-calculate all the weights. This has the inconvenience of requiring expensive computing process power and delays caused by crawler systems, for example, to re-explore the network. It is generally difficult to have a dynamic and individual rank measure between any elements of the network.

Self-organizing map (SOM), also know as Kohonen map, is a subtype of artificial neural networks, and the general idea is to create a pattern recognition system, utilizing competitive learning in a training step. When a training sample is given to the network, its Euclidean distance to all weight vectors is computed. Here, a weight vector is a representation of the neural network links with associated weight measure. The neuron with the smallest distance to the input is called the Best Matching Unit (BMU). While the SOM method generally works with neural network models, it does not work well with graphs in general. An SOM-based system is typically useful in training model systems but tends to be difficult to adapt for real graphs applications.

It is an object of the present invention to mitigate or obviate at least one of the above mentioned disadvantages and to provide an improved system and method of system for classifying, qualifying and relating information.

BRIEF SUMMARY OF THE INVENTION

In one aspect, the invention comprises a method of classifying, qualifying and relating information. The method utilizes a network built from semantic, numeric, conceptual, etc. relationships between elements of different data sets that are structurally alike meaning that their elements can be related to a common set of nodes. The structure of the network changes dynamically as the elements of the network interact with each other. For the purpose of illustration, an information network will be considered to be formed by subjects (users) and registers (documents or information registers) as elements of two data sets that relate to each other by a common set of nodes. Such set of nodes could be, for example, a set of subjects. The documents are related to the set of subjects by their contents and the set of users can be related to the subjects by their interests. Through topological properties of the network, we generate a vector of relations for each element that allows us to analyze the similarity among them, improve and facilitate the clustering processes, carry out personalized dynamic ranking, analyze conduct patterns as well as maintain the auto-evolving dynamics of the network through the interaction and feedback of its elements, among other characteristics. The system of the invention can be used in a wide variety of applications, each application reflecting a particular type of interaction between elements. For example, the system can be used to group people with similar taste inside a social network, or to classify similar movies on a movie database, just to mention a few possible implementation options.

The system when applied to a data bank allows classifying, qualifying and relating information stored therein in an automatic way while implementing links as semantic, numerical or conceptual relations. Each element of a set (or subject) is related to its corresponding nodes, or categories. Subjects (in this case, real users interacting with the system in a dynamic way) all have their own profiles. The system generates a user's profile during an initialization and evolves the profile starting from a vector with an initial homogeneous distribution. The vector, or a subject's profile, evolves as the subject interacts with other subjects. The system provides a means for modeling profile change as a result of each interaction. After a number of interactions, the subject's profile tends to align with a vector that reflects the subject's main interests. A similarity quotient, which reflects how closely two vectors relate, is defined for quantifying and ranking relationships between elements of the network.

BRIEF DESCRIPTION OF THE DRAWINGS

For the purposes of description, but not of limitation, the foregoing and other aspects of the invention are explained in greater detail with reference to the accompanying drawings, in which.

DETAILED DESCRIPTION OF THE INVENTION

Figure 1:
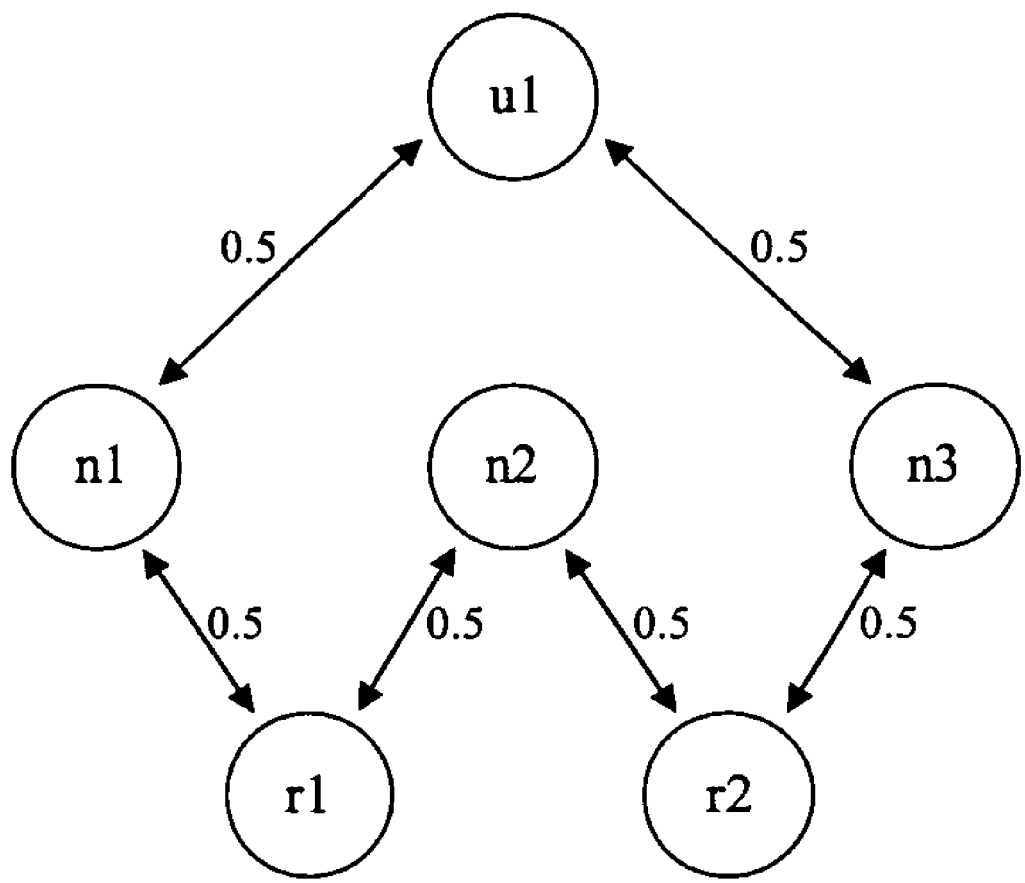
FIG. 1 is a schematic diagram showing an information network.

Although the following detailed description contains many specifics for the purposes of illustration, anyone of ordinary skill in the art will appreciate that many variations and alterations to the following details are within the scope of the invention.

The present invention provides a method of classifying, qualifying and relating information. This method is referred to herein as Active Rank. The method utilizes a network built from semantic, conceptual, numeric, etc., relations between elements of different sets that are structurally alike, understanding structurally alike as different sets that can be related to the same group of network nodes. The system is based on dynamics that underlie the information network built from the interaction among the different elements mentioned before. For this reason, it is possible to define a ranking system that depends not only on the structure of the links of the network, but also on interest profile of each particular element. A vector is defined to capture both the importance of the structure of the links and the interest profiles of participating subjects. This vector is referenced herein as an Active Rank index vector or in general as an Active Rank vector.

An information network, formed from subjects (users) and registers (documents or information registers) as elements of two structurally similar sets that can be related to each other by a common set of network nodes (categories), will be used in order to simplify the explanation and comprehension of the method. Nevertheless, it should be interpreted as the behavior that n Active Rank vectors would have, interacting among themselves, every time they interact.

What is meant by structurally alike sets is that they can be related to the same type of nodes. In other words, in the examples of information networks we will use, although subjects and registers can be related to different conceptual categories, an Active Rank vector of two elements belonging to different sets is structurally identical to an external observer, can be observed as an indistinct element of the network.

Consider two structurally alike sets A and U. In this example, each element a of the set A represents a register and each element u of the set U represents a user. Each elements a and u of the sets A and U can be related to at least one individual category j of a set of M categories. These two sets A and U are structurally alike because they both can be related to the same set of categories. A ranking vector, or Active Ranking Vector, can be defined for each element a, u of the set A, U based on how close the element relates to each of the M categories. As noted, the same symbols will be used to denote the ranking vectors. Thus, a ranking vector for an element a is also denoted as ranking vector a, unless the context requires otherwise. This is expressed as $$a=(a^0,\ldots,a^{M-1}) \text{ and } u=(u^0,\ldots,u^{M-1})$$

where each ranking vector is an M-dimensional vector, with its components representing the degree to which the element a is related to category j. It should be noted that the degree to which an element relates to a category may have different meanings depending on the nature of the set and the set of categories. For example, a set may be defined to represent people in a community. A ranking vector associated with a member in the community may be defined to represent the member's interest profile, with categories being different interest categories such as movies, books, hobbies etc. Each component of the ranking vector in this case represents how important the category is to the member. We can also define a set of documents. A ranking vector associated with a document may be defined to represent how the document is classified based on a set of subject categories, such as history, science, literature etc. In the graph interpretation, register a is related to category j, j∈[0,M−1], if $a^j$>0; similarly, u is related to category j, j∈[0,M−1], if $u^j$>0. It is worth pointing out that the belonging of a register to a category is not exclusive. The system permits an interdisciplinary connection and classification of the information. A vector $x=(x^0, \Lambda, x^{M-1})$ is normalized if it satisfies $$\sum_{j=0}^{M-1} x^j = 1.$$

Conveniently, we can normalize every ranking vector so that each component of the ranking vectors is a positive real value between zero and one.

In addition to ranking vectors defined for each of the elements of structurally alike sets, a link between two elements can be established to represent relationship between an element of one set and an element of another set. The relationship can be semantic, conceptual, numeric, etc., among others. A link weight can be associated with each of such links, to indicate how important the relationship is to these two elements from different sets. A link may also be established to relate two elements of the same set, in which case a link weight measures the similarity of these two elements based on how many common categories they share and to what degree they share the common categories.

FIG. 1 depicts an information network, in which
Nodes={n1,n2,n3}
Registers={r1,r2}
Users={u1}
where,
r1 is link with n1 and n2, both connections has the same link weight (0.5)
r2 is link with n2 and n3, both connections has the same link weight (0.5)
u1 is link with n1 and n3, both connections has the same link weight (0.5)

Figure 2:
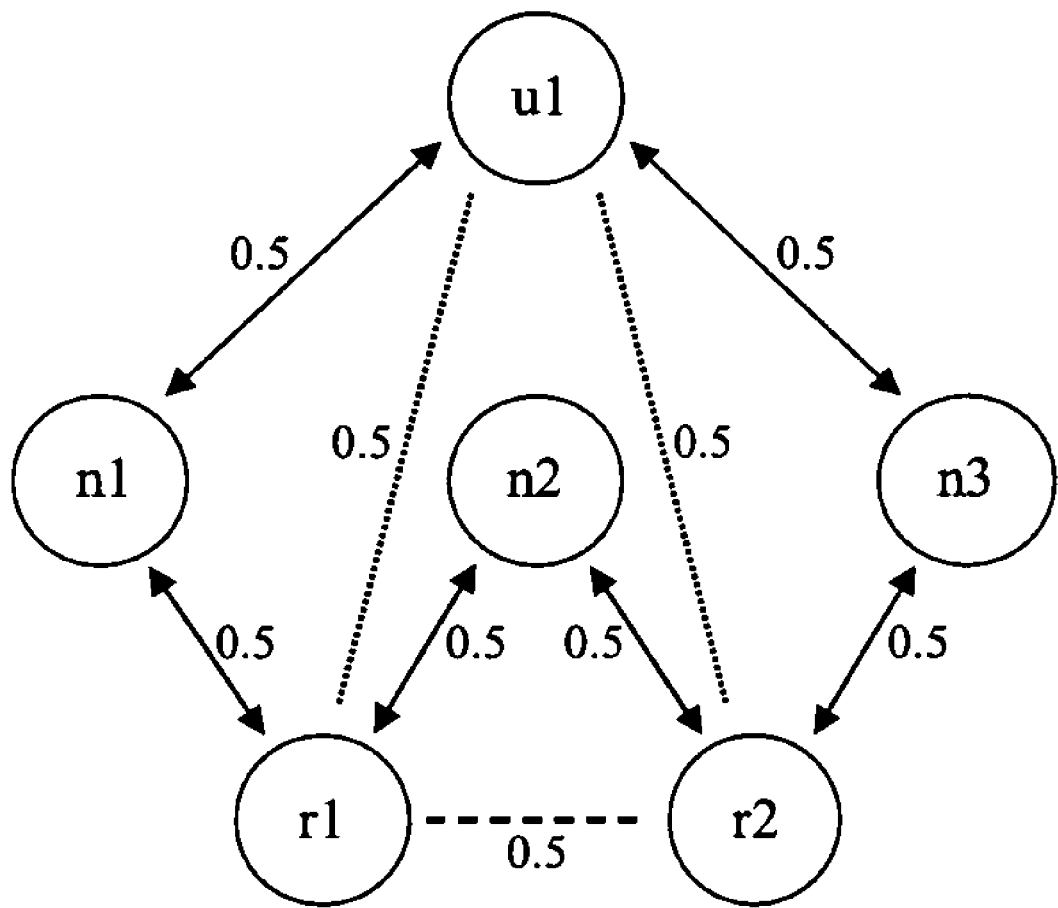
FIG. 2 illustrates the information network shown in FIG. 1 that has two new links created and a virtual link generated.

In FIG. 2, n2 is a common node of r1 and r2 and we can interpret that r1 and r2 are related indirectly by the common relation to n2. We create two more links, a link between u1 and r1 and another link between u1 and r2, using n1 and n3 respectively as a commons nodes of each pair, i.e., although r1 and r2 are not directly linked, they are otherwise unrelated nodes, links with the common nodes who provide secondary connection (and may be viewed as bridge) that link r1 to r2. Conveniently, r1 and r2 may also be viewed as connected to each other directly via a virtual link, shown in a dash-dotted line linking r1 and r2. The magnitude indicated next to each of the new links corresponds to the ranking measure (or similarity quotient) between the two corresponding vertexes.

One must be cautious not to confuse link weight and ranking. Ranking is a property we can measure between elements of the network. The link weights have to be defined in order to generate the network in which ranking measurements will be made. Nevertheless, ranking measurements can be interpreted as link weight for virtual links mentioned before.

As an example for understanding better the effect of an interactive system, we define the interaction of the user with the system as each incident of download of any register (i.e., document); so, if the user u1 downloads the register r1, or document r1, five times, the link between u1 and r1 will have an increased ranking measure. This is illustrated in FIG. 3, which also shows new values of the Active Rank vectors represented in the network.

Figure 3:
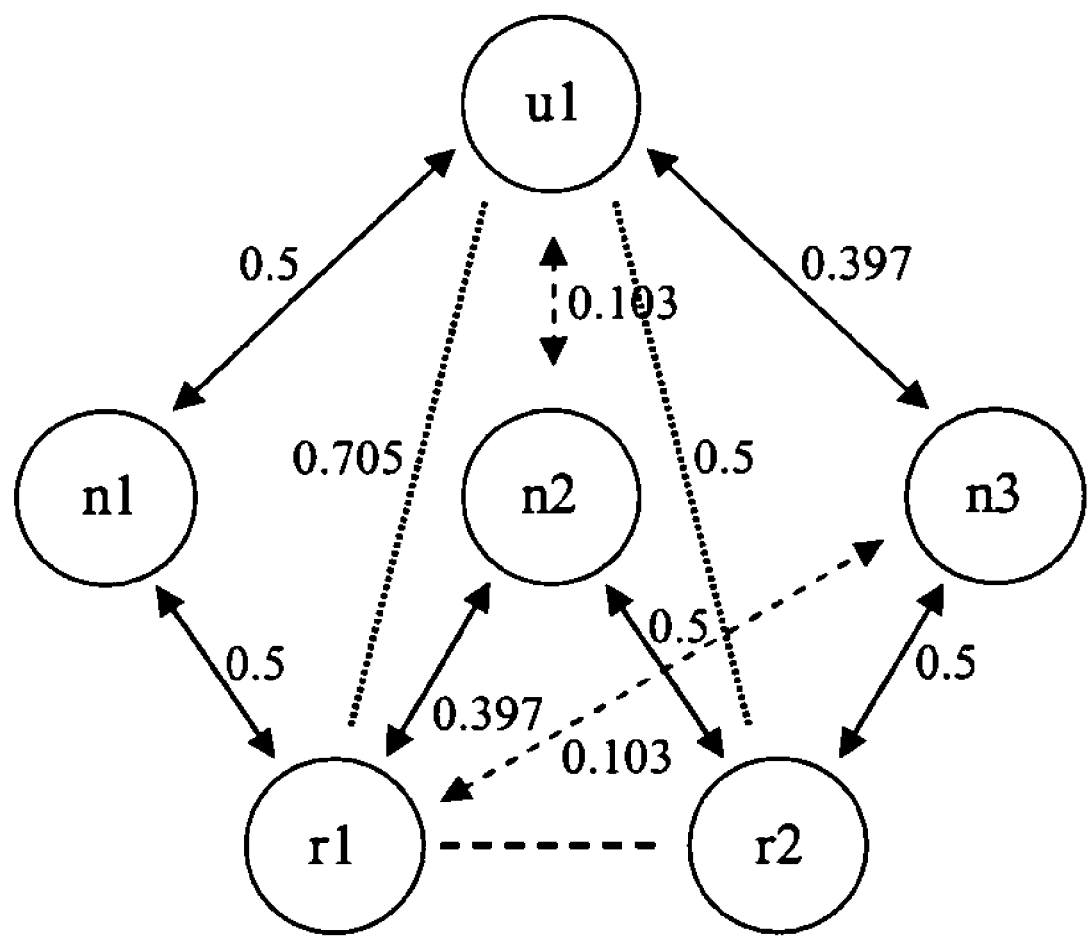
FIG. 3 illustrates evolution of the network shown in FIG. 2 as a result of interaction of users with the system.

FIG. 3 shows that the ranking measure of a link between r1 and u1 is now larger, indicating that r1 and u1 are more similar now. The network shown in FIG. 3 also includes a new real link created by u1 (from u1 to n2), and another new real link from r1 to n3, thus increasing the interconnections inside the network. Because of the interactions, the ranking measure associated with u1 and r1 has changed, indicating redistribution of relative weight among other links. It will be appreciated that the values of weight and ranking measures shown in FIG. 3 are for illustration only and will be different for different systems.

Having shown an example of an information network and the evolution of the network as a result of interactions between elements of the network, we next describe a system and method of classifying, qualifying and relating information based on mathematical graphs and networks, referred to herein as "Active Rank". For explanation purposes only, we are going to explain it using an information network. Using Active Rank, one can classify information into categories. Suppose we have M categories, numbered form 0 to M−1, in which we want to classify our information. Then, we define an Active Rank vector which is a basic unit of the system. Consider Active Rank vectors $a=(a^0, \ldots, a^{M-1})$ and $u=(u^0, \ldots, u^{M-1})$ where each component of the vectors is a positive real value between zero and one. Suppose, for the purpose of explanation, that the vectors a and u represent the associated Active Rank vectors of a user u and a register a respectively. Each vertex of the network is associated with an Active Rank vector. The set of users and the set of registers are considered to be structurally similar in that they can be related to the same group of network nodes. In other words, they both relate to the same set of categories. We therefore will use Active Rank vector a and register a interchangeably. We will also use Active Rank vector u and user u interchangeably. Further, we will treat a and u as elements of the network.

In the graph interpretation, register a is related to category j, $j \in [0, M-1]$, if $a^j > 0$; similarly, u is related to category j, $j \in [0, M-1]$, if $u^j > 0$. When initializing an Active Rank system, ranking vectors a and u will need to be initialized. They may be initialized by assigning an initial value, the same value, to each component of each ranking vectors. Alternatively, they may be initialized using statistical information already known about the set of registers and set of users. For example, there may be known, or pre-existing information that one can get from network structure, or existing relationships between one element (user, documents, etc.) with all other elements or vertexes of the network. For example, the frequency a particular word appearing in a document may be used as statistical information to relate the document to nodes that represent a set of keywords. The frequency in this case represents the degree to which the document is related to the particular word. As another example, consider the total number of hypertext links that a webpage has with other webpages in certain category. The number of hypertext links may be used as pre-existing statistical information when initializing an Active Rank vector associated with the webpage.

In general, using Active Rank the dynamic of the network is determined by the interaction between different elements of the network itself and is reflected in the evolution of the Active Rank vectors, i.e., the change of the vector values. In one embodiment, these vectors represent the interest profiles. When two elements interact, we would expect that the profiles of both elements would be affected according to an existing similarity between them. More particularly, if these two vectors can influence each other through their interactions with each other, we would expect that, after sufficient number of interactions, both vectors would converge toward each other, or even could reach some common convergence point.

Here is an example to illustrate this convergence. When two different persons interact eventually they will find their common interests, and at the same time they each adopt some of the other's interests that they did not have. If this interaction was carried out all the time or a great number of times, then both profiles would be very similar eventually.

These interests, or weights assigned to interests for each subject, may evolve or redistribute in a number of different manners. The following illustrates two different ways the interests or weights can evolve or redistribute as a result of interaction between two elements. The first one is when a first element affects the latter and does not suffer alterations itself. Depending on how strongly the first element can influence the latter element, after a number of interactions, the latter element generally will adopt the pattern of interests of the applicator (i.e., the first element) as its own. The second is when there is feedback; this is when simultaneously both elements influence each other, where the result will be convergent values in an intermediate profile for both elements. The mono-directional or bi-directional effect depends on the nature of interactions among elements in the system. The method described herein is applicable whether the influence exhibited is mono-directional or bi-directional. Next we describe a weight redistribution algorithm to illustrate how to mathematically model the evolution of vectors. It will be appreciated that other mathematical models can be developed to mimic the evolution of vectors or relationships as a result of interaction between elements.

Let $\kappa \in (0,1]$ be an arbitrary interaction coefficient that reflects speed of weight redistribution at each interaction. The interaction coefficient is generally selected to model and typically determined by the nature of interactions among the elements in the system and is a parameter of the algorithm described herein. Let a and u be the two Active Rank vectors previously initialized, associated to a (register) and u (subject) as we explain before, and where u applies over a (the subject interact with the register modifying the Active Rank vector values of vector a). We define an application of the element u over a during an interaction as: $a^j_{new} = a^j + \kappa(u^j - a^j)$, where the result of the calculation on the right hand side of the equation is assigned to the variable on the left hand side.

The application of vector a over vector u can be similarly defined. If the application is bidirectional, both formulas are applied simultaneously. The redistribution of link weight that happens during the elements interaction is one important aspect of the Active Rank algorithm.

As the vectors are generally normalized, the components of an Active Rank vector add up to one. When a new register (or new element) is added to the system, the Active Rank vector associated with each element is preferably normalized again, or re-initialized. There are different ways of initializing an Active Rank vector. Selection of a particular method of initialization is generally part of a system's implementation choice.

On the other hand, when a new node (i.e., new category) is generated in the network, we simply need to add a null component to all Active Rank vectors of the network, all in the same position. This is expressed as:

If a new node is added to the network and the Active Rank vectors of the network have the form $a=(a^0, \ldots, a^{M-1})$, then a new position M+1 is added and the value $a^M=0$ is defined for all existing vectors.

As will be appreciated, there can be many different ways of adding a new node (or a new register). The methods described above are only some examples, for illustration only.

A general ranking or similarity quotient ρ is defined for any pair of elements of the network. The ranking or similarity quotient is determined from the involved Active Rank vectors; the set of vectors representing the structure of the network links. Conveniently, we can also represent the set of vectors in a matrix form to represent the network.

We define the ranking between two elements a and u as:

$$\rho(a, u) = 1 - \frac{1}{2}\sum_{j=0}^{M-1} |a^j - u^j| \text{ where } \rho(a, u) \in [0,1].$$

The rankings associated with links between elements are illustrated in FIGS. 2 and 3. The dotted lines between r1 and u1 and r2 and u1 represent the virtual links between the respective pair of elements. The numbers shown next to the dotted lines are values of ρ(r1, u1) and ρ(r2, u1) respectively. In FIG. 2, both values are equal to 0.5, and can be interpreted that r1 and r2 are equally important to the element u1 at that time. But in FIG. 3, after five interactions between u1 and r1, the values of the new ranking measures are ρ(r1, u1)=0.705 and ρ(r2, u1)=0.5. The increase of ranking measure between r1 and u1 is a consequence of the interaction between them.

Note that ρ(a,u)=ρ(u,a) and that the larger the value ρ(a,u) is, the more close the relation between the elements. A value ρ(a,u)=0 indicates that the elements do not share any connection with any node in common, and that all of their relations are non-coincidental, while ρ(a,u)=1 expresses that both elements have the same Active Rank vector.

Two elements $u_1$ and $u_2$ can have the same ranking measure in relation to a third element c, $\rho(c,u_1)=\rho(c,u_2)$, and a null value as for themselves, $\rho(u_1,u_2)=0$. This implies that two different elements can have the same relational importance to a third element, without being connected in the same way between themselves, including not sharing nodes in common.

This method allows us to quantify the relation between two elements of the network, in this case a and u. Therefore, if we obtain the ranking between a set of elements, $U=\{u_0, \Lambda, u_{M-1}\}$, and another element, a, we can rank all elements in set U with reference to element a as the base. This ranking subsequently provides a foundation for sorting results according to relevance to a specific user. For example, this can be used in the case where a user with the Active Rank vector u submits a search query, and A is the set of Active Rank vectors associated to the set of network elements where you want to search. Ordering the results by ranking provides a list of results of a query where probably the top ranked results are more relevant to the user than the ones ranked last. This can be observed as a personalized search system.

We can also do the individual analysis of the Active Rank vector values of any element; where we interpret the value of each index as the particular ranking that such element has with certain node, as was explained earlier. The former is possible due to the fact that after a relatively small number of interactions, the specific weight for each element of the vector mentioned before converges. It is evident that said convergence is limited by the nature of the system where the method is applied, as well as its particular dynamic and the sets that interact.

As described above, the present invention provides a computer implemented method that generates relations between elements of diverse sets, generates a measure of dynamic weight for each relation and obtains dynamic coefficients of similarity between the elements of the sets. The method includes the steps of generating the relation between the elements of a given data set based on individual relationships of its elements with other elements from other sets; generating a dynamic measure of link weight for each relation, which can be modified by the interaction between elements of the same or other set; obtaining and processing coefficients of similarity between elements of the sets, which are dynamic and are utilized to generate subsets of similar elements. The dynamic characteristics mentioned before express that the values and situations can change by the network interaction, and the different steps can be applied all the times that be necessary.

Figure 4:
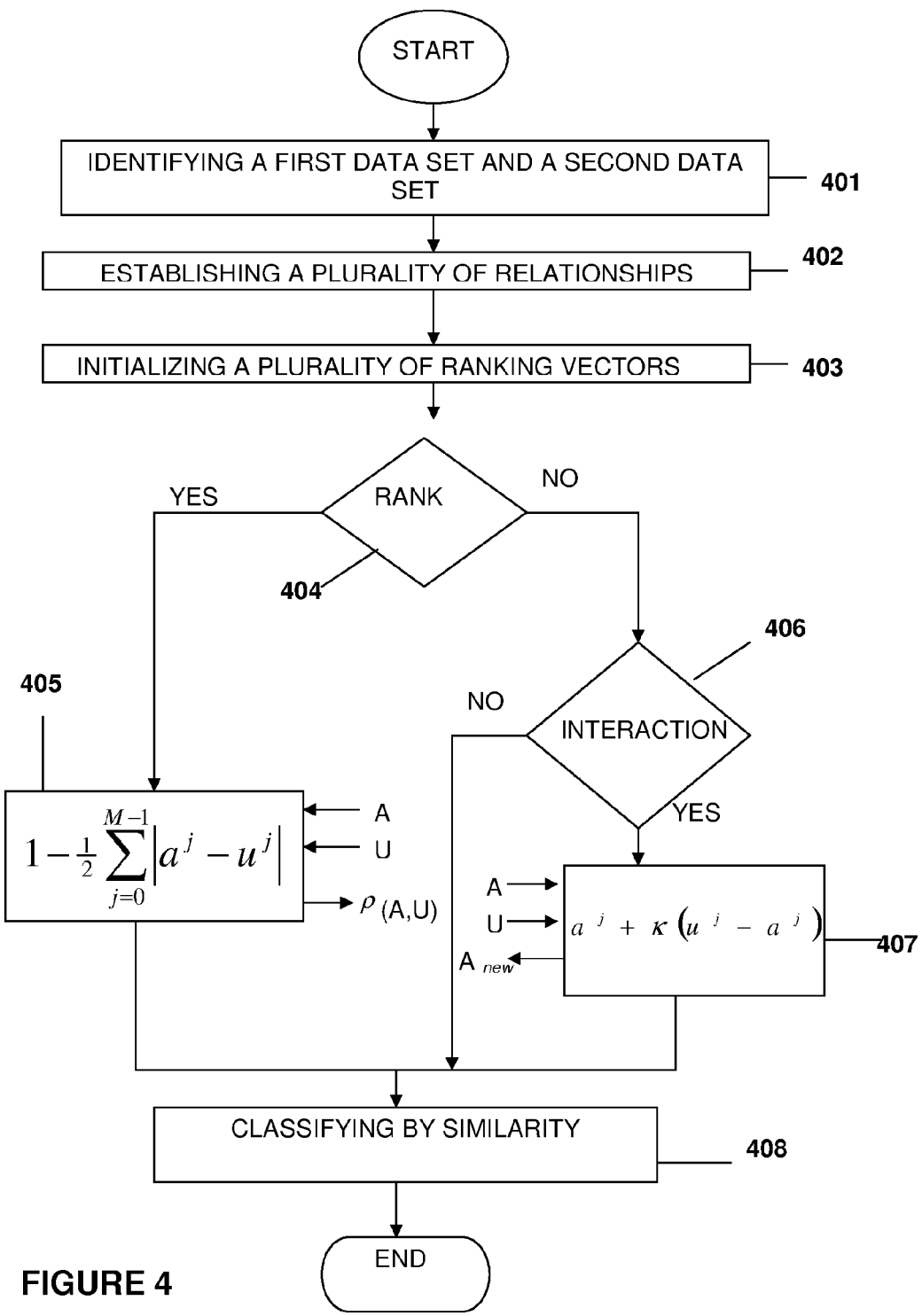
FIG. 4 illustrates a flowchart of a computer-implemented method.

FIG. 4 illustrates a flowchart of the computer-implemented method, wherein a computer-implemented method identifies a first data set and a second data set (401), establishing a plurality of relationships (402), each of the plurality of relationships linking an element of the first data set to an element of the second data set, identifying a set of categories for categorizing elements of the first and second data sets; the computer-implemented method initializes a plurality of ranking vectors (403), firstly initializing the first ranking vectors, each of the first ranking vectors corresponding to an element of the first data set, each component of the each first ranking vector representing a degree to which the element is related to one of the categories; second initializing a plurality of second ranking vectors, each of the second ranking vectors corresponding to an element of the second data set, each component of the each second ranking vector representing a degree to which the element is related to one of the categories; initializing an Active Rank vector (404) if yes, assigning a link weight to each of the plurality of relationships of interconnected elements of the first and second data sets, said link weight being modifiable by interaction between the elements linked by the each relationship; wherein the similarity quotient is computed from a formula (405):

$$1 - \frac{1}{2}\sum_{j=0}^{M-1} |a^j - u^j|$$

wherein $a^j$ and $u^j$ are components of the first and second ranking vectors a and u, respectively, and the first and second ranking vectors a and u are M-dimensional and normalized; if not, the interaction coefficient is generally selected to model and typically determined by the nature of interactions (406) assigning a link weight to each of the plurality of relationships of interconnected elements of the first and second data sets, said link weight being modifiable by interaction between the elements linked by the each relationship (407); wherein the ranking vectors are ranking vectors a and u, and each component $a^j$ of the at least one ranking vector a is incremented by an amount proportional to a difference between components $a^j$ and $u^j$ of the ranking vectors a and u, the amount being computed from $\kappa*(u^j-a^j)$, ☒being an interaction coefficient; and computing a similarity quotient for the each relationship of the plurality of relationships, the similarity quotient being a measure of similarity between the elements linked by the each relationship, and classifying the plurality of relationships based on values of the similarity quotients (408).

Clustering algorithms can be applied to different sections of the network structure. These clustering algorithms can be applied to elements and nodes which are both vertexes of the graph. If a and b are connected vertexes, and there is a link between a and another vertex c, then it is probable that b and c are also related. This trend of the vertices to aggregate in highly interconnected piles is known as clustering. For example, members of a society tend to group in small communities where everybody knows almost everyone.

In information networks, thanks to the use of Active Rank one can determine the weight of each link of each element (subject, register, document, etc.), and relate them to find out the importance of a determined link and, thanks to this, can build a more efficient clustering algorithm that automatically generates more representative groups.

An Active Rank vector can be interpreted as a point in a space. Such a space may be a vector space, but in general, is a space with Active Rank vectors corresponding to points in the space. When we have a succession of Active Rank vectors that represents an element of a network that varies with time and we interpret them as points we get a trajectory in this space. If we extrapolate the trajectory we can predict the behavior of the element by its associated new predicted Active Rank vector. With the trajectory interpretation many aspects of the behavior can be analyzed.

In one embodiment, the interaction dynamic between the elements of the sets in each system depends on the nature and objectives of the system itself. A model can be established to describe the interaction. According to a feature of this aspect of the algorithm, the value of an interaction coefficient used in modeling the interaction depends directly on the interaction nature (frequency, individual importance, etc.) and can vary according to the system, also can be adjusted during the processes of interaction if necessary. This in turn determines the change of Active Rank vector a at each application of the element u over element a during each interaction.

In one implementation, the method divides the network into sets or blocks. These sets or blocks develop some action such as: making use of the dynamic link weights of relation between the elements of the sets to determine similarity coefficients; self-organizing the elements of the different sets from the similarity coefficients and the analysis of the dynamic link weights of relation between the elements; processing interaction between the elements of the sets that redistributes the link weight between each relation; redistributing the link weights of relations of an element based on the values of link weights of relations of the elements which it interacts with.

Based on the relations generated between the elements of the sets, one can develop, implement or improve search, administration or other kind of analysis or information processing system. In addition, the method can be used to sort the results of a search or query making use of the similarity coefficients between the elements. The dynamic link weight of relations between elements can also be used in the sorting of results of a search or query.

The system and method can be implemented on any computer system, platform, architecture and in any programming language, whether distributed systems, parallel computing or other technology. For example, the system and method may be implemented as a software application, stored on a computer readable media, such as magnetic hard disk, optical compact disk or flash memory, and read by a computer and executed on a processor of the computer. There is no restriction as to storing the information generated using any particular database systems or any data storing system. The method can be applied to any set of information which is being read and/or modified simultaneously by any other method, without limiting itself to any particular implementation for the analysis of information sets.

In one embodiment, the method includes: providing a measure of dynamic link weight for each relation substantially independent of the type of data set or the type of category information which is being processed; and computing a dynamic coefficient of similarity independent of the type of elements of either the data set or category information which are being processed; the interpretation of generated results as interests profiles. In another embodiment, steps include: using statistical information to generate or initialize active rank vectors; the use of computing optimization method such as number rounding or other types of optimization.

The invention also can be used to provide a graphical representation of a computer implemented method and the results generated by the algorithm. The graphical representation provides an easy way to visualize the Active Rank vectors as a network or a set of points in a defined space; a representation of the relation weights between elements by characters, icons, figures, colors or size on a network or as points in space; a representation of the different sets involved as different interrelated networks, and includes development and implementation of graphical navigation systems for networks generated with Active Rank vectors. The graphical representation of the network can be conveniently shown on a graphical user interface, such as on a graphical computer display.

The invention also can be used to provide a textual representation of a computer implemented method and the results generated by the algorithm. The textual representation provides a numeric data of Active Rank vectors; a tabular representation of Active Rank vectors; a numeric representation of the relation weights; and includes the development of textual navigation systems for networks generated with Active Rank vectors.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

I claim:

1. A computer-implemented method, comprising:
   identifying a first data set and a second data set,
   establishing a plurality of relationships, each of the plurality of relationships linking an element of the first data set to an element of the second data set,
   identifying a set of categories for categorizing elements of the first and second data sets,
   initializing a plurality of first ranking vector, each of the first ranking vectors corresponding to an element of the first data set, each component of the each first ranking vector a representing a degree to which the element is related to one of the categories,
   initializing a plurality of second ranking vector, each of the second ranking vectors corresponding to an element of the second data set, each component of the each second ranking vector u representing a degree to which the element is related to one of the categories, assigning a link weight to each of the plurality of relationships of interconnected elements of the first and second data sets, said link weight being modifiable by interaction between the elements linked by the each relationship, computing a similarity quotient for the each relationship of the plurality of relationships from a formula:

$$1 - \frac{1}{2}\sum_{j=0}^{M-1}|a^j - u^j|$$

wherein $a^j$ and $u^j$ are components of the first and second ranking vectors a and u, respectively, and the first and second ranking vectors a and u are M-dimensional and normalized; and classifying the plurality of relationships based on values of the similarity quotients.

2. The method of claim 1, further comprising:
ranking the plurality of relationships based on values of the similarity quotients.

3. The method of claim 1, further comprising:
applying a clustering operation to the plurality of relationships to generate clusters of similarity quotients,
wherein the relationships are classified based on the clusters of similarity quotients.

4. The method of claim 3, wherein the plurality of relationships form a network of interconnected elements of the first and second data sets, the network including indirect links between elements of the same data set and between elements of different data sets; and wherein the clustering operation is applied to a section of the network.

5. The method of claim 1, wherein each interaction between any pair of elements modifies at least one of the ranking vectors corresponding to the pair of interacting elements, the pair of interacting elements being 1) any two elements of the first data set, 2) any two elements of the second data set, or 3) an element of the first data set and an element of the second data set.

6. The method of claim 5, wherein each component $a^j$ of the at least one ranking vector a is incremented by an amount proportional to a difference between components $a^j$ and $u^j$ of the ranking vectors a and u, the amount being computed from $\kappa^*(u^j-a^j)$, $\kappa$ being an interaction coefficient.

7. The method of claim 6, further comprising:
keeping a record of the at least one ranking vector a after each interaction of the interactions,
generating a trajectory of the at least one ranking vector a as a function of the interactions, and
predicting values of components of the at least one ranking vector a by extrapolating the trajectory to extrapolate the at least one ranking vector a and evaluating the extrapolated at least one ranking vector a.

8. The method of claim 6, wherein the interaction coefficient varies during an interaction.

9. A computer-implemented method, comprising:
identifying a first data set and a second data set,
establishing a plurality of relationships, each of the plurality of relationships linking an element of the first data set to an element of the second data set,
identifying a set of categories for categorizing elements of the first and second data sets, initializing a plurality of first ranking vectors A, each of the first ranking vectors corresponding to an element of the first data set, each component of the each first ranking vector representing a degree to which the element is related to one of the categories, initializing a plurality of second ranking vectors U, each of the second ranking vectors corresponding to an element of the second data set, each component of the each second ranking vector representing a degree to which the element is related to one of the categories, assigning a link weight to each of the plurality of relationships of interconnected elements of the first and second data sets, said link weight being modifiable by interaction between the elements linked by the each relationship, wherein the ranking vectors are ranking vectors a and u, and each component $a^j$ of the at least one ranking vector a is incremented in an interaction by an amount proportional to a difference between components $a^j$ and $u^j$ of the ranking vectors a and u, the amount being computed from $\kappa^*(u^j-a^j)$, $\kappa$ being an interaction coefficient;

computing a similarity quotient for the each relationship of the plurality of relationships, the similarity quotient being a measure of similarity between the elements linked by the each relationship and determined from the ranking vectors a and u, and classifying the plurality of relationships based on values of the similarity quotients.

10. The method of claim 9, further comprising:
ranking the plurality of relationships based on values of the similarity quotients.

11. The method of claim 9, further comprising:
applying a clustering operation to the plurality of relationships to generate clusters of similarity quotients,
wherein the relationships are classified based on the clusters of similarity quotients.

12. The method of claim 11, wherein the plurality of relationships form a network of interconnected elements of the first and second data sets, the network including indirect links between elements of the same data set and between elements of different data sets; and wherein the clustering operation is applied to a section of the network.

13. The method of claim 9, wherein each interaction between any pair of elements modifies at least one of the ranking vectors corresponding to the pair of interacting elements, the pair of interacting elements being 1) any two elements of the first data set, 2) any two elements of the second data set, or 3) an element of the first data set and an element of the second data set.

14. The method of claim 9, further comprising:
keeping a record of the at least one ranking vector a after each interaction of the interactions,
generating a trajectory of the at least one ranking vector a as a function of the interactions, and
predicting values of components of the at least one ranking vector a by extrapolating the trajectory to extrapolate the at least one ranking vector a and evaluating the extrapolated at least one ranking vector a.

15. The method of claim 9, wherein the interaction coefficient varies during an interaction.

* * * * *